United States Patent [19]

Bühler et al.

[11] Patent Number: 4,950,305
[45] Date of Patent: Aug. 21, 1990

[54] WATER-INSOLUBLE MONOAZO DYES, THEIR PREPARATION AND USE, AND MIXTURES OF THESE MONOAZO DYES

[75] Inventors: Ulrich Bühler, Alzenau; Margareta Boos, Hattersheim; Reinhard Kühn, Frankfurt, all of Fed. Rep. of Germany

[73] Assignee: Cassella Aktiengesellschaft, Frankfurt am Main, Fed. Rep. of Germany

[21] Appl. No.: 389,945

[22] Filed: Aug. 7, 1989

[30] Foreign Application Priority Data

Sep. 15, 1988 [DE] Fed. Rep. of Germany ....... 3831356

[51] Int. Cl.$^5$ ..................... C09B 29/00; C09B 29/36; C09B 29/09
[52] U.S. Cl. ............................ 8/639; 8/662; 534/630; 534/640
[58] Field of Search ................. 8/639, 662; 534/630, 534/640

[56] References Cited

U.S. PATENT DOCUMENTS

| | | | |
|---|---|---|---|
| 4,105,655 | 8/1978 | Gottschlich et al. | 8/662 |
| 4,452,609 | 6/1984 | Hamprecht | 8/662 |
| 4,479,899 | 10/1984 | Hamprecht | 8/639 |

FOREIGN PATENT DOCUMENTS

| | | |
|---|---|---|
| 760539 | 12/1970 | Belgium . |
| 0025903 | 9/1980 | European Pat. Off. . |
| 168069 | 9/1984 | Japan . |

Primary Examiner—A. Lionel Clingman
Assistant Examiner—J. Darland
Attorney, Agent, or Firm—Connolly & Hutz

[57] ABSTRACT

Hydrophobic textile materials can be dyed or printed with one or more monoazo dyes of the formula

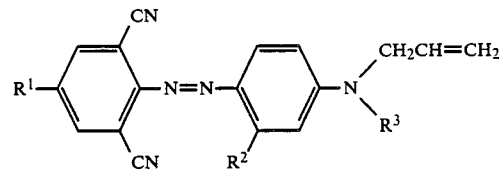

in which
$R^1$ is fluoro, chloro or bromo;
$R^2$ is hydrogen or chloro; and
$R^3$ is allyl, alkyl having 1 to 4 carbon atoms, alkoxyalkyl having 2 to 4 carbon atoms in the alkyl portion and 1 to 4 carbon atoms in the alkoxy portion or cyanoalkyl having 2 to 4 carbon atoms.

9 Claims, No Drawings

WATER-INSOLUBLE MONOAZO DYES, THEIR PREPARATION AND USE, AND MIXTURES OF THESE MONOAZO DYES

The present invention relates to valuable new monoazo dyes of the general formula I

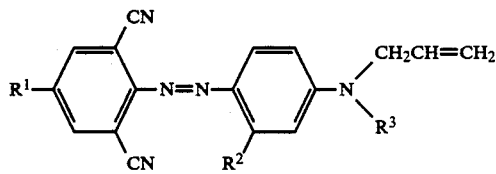

in which
R¹ is fluorine, chlorine or bromine,
R² is hydrogen or chlorine,
R³ is alkyl having 1 to 4 C atoms, allyl, alkoxyalkyl having 2 to 4 C atoms in the alkyl group and 1 to 4 C atoms in the alkoxy group or cyanoalkyl having 2 to 4 C atoms.

The invention also relates to mixtures of dyes of the general formula I and the preparation of these dyes and their mixtures and to their use for the dyeing and printing of hydrophobic materials.

Dyes similar to the dyes according to the invention are already known and have been described in EP No. 25,903, EP No. 155,470 and JP No. 1,227,092. Surprisingly, it has now been found that the dyes according to the invention of the general formula I and the mixtures of these dyes are superior to the known dyes in their colouristic property on various substrates, in particular at dyeing temperatures below 130° C., in their sensitivity to pH and reduction and in some important wear fastness properties, for example light fastness and wet fastness.

Alkyl radicals R³ can be branched, but are preferably linear. Linear alkyl radicals R: are methyl, ethyl, n-propyl and n-butyl.

Alkoxy groups R³ having 1 to 4 C atoms in the alkoxyalkyl radicals are, for example, methoxy, ethoxy, n-propoxy, i-propoxy, n-butoxy, i-butoxy or tert.-butoxy.

These alkoxy radicals can be in any position of the alkyl radical of the alkoxyalkyl groups with the exception of the 1-position, for example in the 2-position of an ethyl group, in the 2- or 3-position of a propyl group and in the 2-, 3- or 4-position of a butyl group.

Examples of these types of alkoxyalkyl groups are 2-methoxyethyl, 2-butoxyethyl, 2-tert.-butoxyethyl, 2-methoxypropyl, 2-methoxypropyl, 2- or 3-propoxypropyl, 2-, 3- or 4-methoxybutyl. Preference is given to those alkoxyalkyl radicals in which the alkoxy group is bound to the terminal C of the alkyl chain. Preferred alkoxyalkyl radicals R³ are alkoxyethyl radicals, in particular methoxyethyl and ethoxyethyl radicals.

Cyanoalkyl radicals R³ are 2-cyanoethyl, 3-cyano1-propyl, 3-cyano-2-propyl and 4-cyanobutyl.

A preferred cyanoalkyl radical R³ is the 2-cyanoethyl radical.

Preferred radicals R³ are n-propyl and, in particular, ethyl and allyl.

Preferred radicals R¹ are chlorine and bromine.

A preferred radical R² is hydrogen.

Preferred dyes of the general formula I are those in which R¹ is chlorine or bromine and R² is hydrogen.

Particularly preferred dyes of the general formula I are those containing the preferred radicals R¹, R² and R³.

The dyes according to the invention of the general formula I can be prepared by subjecting azo dyes of the general formula II

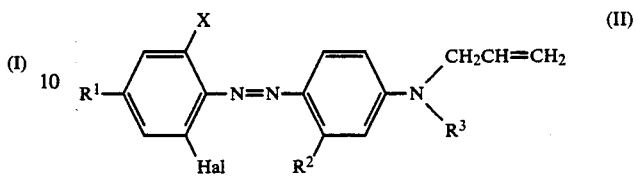

in which R¹, R² and R³ have the abovementioned meanings, X denotes cyano or Hal and Hal denotes a halogen atom such as chlorine or, in particular, bromine in a manner known per se, for example by the procedures given in German Offenlegungsschrift No. 1,809,920, German Offenlegungsschrift No. 1,809,921 (U.S. Pat. No. 3,845,034), UK Patent No. 1,184,825, German Auslegeschrift No. 1,544,563 (CA-801,661; 848,428 and 856,780), German Offenlegungsschrift No. 2,310,745 (U.S. Pat. No. 3,978,040), German Auslegeschrift No. 2,456,495 (GB No. 1,479,085), German Auslegeschrift No. 2,610,675 (U.S. Pat. No. 4,348,310), German Offenlegungsschrift No. 2,724,116, German Offenlegungsschrift No. 2,724,117 (GB No. 1,578,731; 1,578,732 and 1,598,799), German Offenlegungsschrift No. 2,834,137 (U.S. Pat. No. 4,192,800), German Offenlegungsschrift No. 2,341,109 (GB No. 1,438,374), U.S. Pat. No. 3,821,195, German Offenlegungsschrift No. 2,715,034 (U.S. Pat. No. 4,126,610 and 4,165,297) or German Offenlegungsschrift No. 2,134,896 (U.S. Pat. No. 3,876,621), to a nucleophilic exchange reaction, in which the cyanide ion CN$^\ominus$ is used as the nucleophile.

The solvents used for the exchange reaction are inert organic solvents, such as, for example, nitrobenzene or glycol monomethyl ether or monoethyl ether or diglycol monomethyl or monoethyl ether or mixtures of these solvents with one another and with tertiary organic nitrogen bases, dipolar aprotic solvents, such as, for example, N-methylpyrrolidone, pyridine, dimethyl formamide, dimethyl sulphoxide or dicyanodialkyl thioethers. Further suitable media for the exchange reaction are water or aqueous systems consisting of water and a water-imiscible organic solvent, such as, for example, nitrobenzene, preferably in the presence of a wetting or dispersing agent or a known phase transfer catalyst or consisting of water and a water-soluble, inert organic solvent, such as ethylene glycol or dimethylformamide.

The presence of organic, basic nitrogen compounds, such as, for example, pyridine and pyridine bases has a favourable effect on the exchange reaction.

The reaction temperatures for the exchange reaction are usually between 20° and 150° C.

The nucleophile CN$^\ominus$ is added to the reaction in the form of a metal cyanide or complex metal cyanide, such as, for example, an alkali metal cyanide or alkaline earth metal cyanide, zinc cyanide, alkali metal cyanozincate or alkali metal cyanoferrate, but preferably in the form of copper(I) cyanide or a system forming copper(I) cyanide. The use of a combination of alkali metal cyanide with copper(I) cyanide, in which the weight ratio of alkali metal salt and copper salt can be varied within wide limits, has proven to be particularly suitable.

The usual range of the alkali metal cyanide/copper(I) cyanide ratio is from 5:95 to 95:5. The positive mutual effect of the components can still be detected outside these limits. As far as the copper(I) cyanide is concerned, it is of course also possible to replace it by a system forming copper(I) cyanide, such as, for example, a combination of alkali metal cyanide with another copper salt, preferably copper(I) salt, such as, for example, a copper(I) halide.

The dyes of the general formula II required for the preparation of the dyes according to the invention of the general formula I can be prepared by coupling a diazonium compound of an aromatic amine of the general formula III

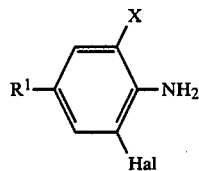           (III)

with a coupling component of the general formula IV

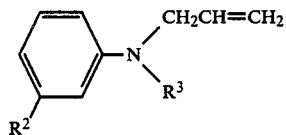           (IV)

in which $R^1$, $R^2$ and $R^3$ have the abovementioned meanings.

The diazonium compounds are obtained from the amines of the general formula III in a manner known per se by reacting them with nitrous acid or other systems forming nitrosonium ions in a mineral acid or an aqueous mineral acid medium, a lower alkanecarboxylic acid, such as, for example, formic acid, acetic acid or propionic acid or mixtures thereof, or an organic solvent at temperatures from −15° C. to 40° C.

The coupling reaction is also carried out in a manner known per se by combining the diazonium salt solution obtained with a solution of the coupling component at temperatures from 0° to 40° C., preferably 0° to 25° C., in a suitable solvent, such as, for example, an alkanol having 1 to 4 C atoms, dimethylformamide, preferably in water acidified by sulphuric acid, hydrochloric acid or phosphoric acid, or a water-containing or anhydrous lower alkanecarboxylic acid or a lower alkanecarboxylic acid mixture, if desired, even in the presence of an alkanol which has limited miscibility with water. In some cases, it may be advantageous to buffer the pH during the coupling reaction, for example by addition of sodium acetate. The coupling reaction is finished after a few hours, and the dye of the general formula II can be isolated and dried as usual.

The required components of the general formulae III and IV can be prepared from known commercial products by known processes.

A further process for the preparation of the dyes according to the invention of the general formula I consists in diazotizing an amine of the general formula V

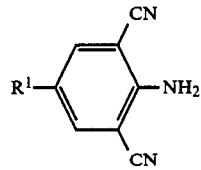           (V)

and coupling the product onto a coupling component of the general formula IV

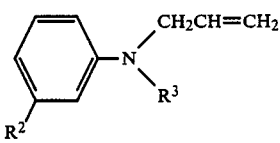           (IV)

in which $R^1$, $R^2$ and $R^3$ have the abovementioned meanings.

The diazonium compounds are obtained from the amines of the general formula V in a manner known per se by reacting them with nitrous acid or other systems forming nitrosonium ions in a mineral acid or an aqueous mineral acid medium, a lower alkanecarboxylic acid, such as, for example, formic acid, acetic acid or propionic acid or mixtures thereof, or an organic solvent at temperatures from 0° to 40° C.

In this case, too, the coupling reaction is carried out in a manner known per se by combining the diazonium salt solution obtained with a solution of the coupling component at temperatures from 0° to 40° C., preferably 0° to 25° C. in a suitable solvent, such as, for example, an alkanol having 1 to 4 C atoms, dimethylformamide, preferably in water acidified by sulphuric acid, hydrochloric acid or phosphoric acid, or a watercontaining or anhydrous lower alkane carboxylic acid or a lower alkane carboxylic acid mixture, if desired, even in the presence of an alkanol which has limited miscibility with water. In some cases, it may be advantageous to buffer the pH during the coupling reaction, for example by addition of sodium acetate. The coupling reaction is completed after a few hours, and the dye can be isolated and dried as usual.

The dye mixtures according to the invention consist of two or more dyes of the general formula I in which $R^1$, $R^2$ and $R^3$ have the abovementioned meanings.

The mixtures according to the invention can be prepared by mixing the separately prepared and finished individual dye components. This mixing can be carried out in suitable mixers or mills or even by stirring them into the dye liquor. It is, however, preferred to finish the separately prepared individual dye components together, it being possible for the mixing to be carried out immediately before the spray-drying in the case of the preparation of dye powders and preferably before the milling in the case of dye powders and liquid dye preparations. In this case it is particularly preferred to carry out a joint thermal stabilization before the milling.

According to a particularly preferred process, the dye mixtures according to the invention can be prepared by exchanging halogen for cyano in a manner known per se in dye mixtures consisting of at least two dyes of the general formula II, such as, for example, has already been described above for the individual dyes, and finishing the resulting mixture. The composition of the mixture of the dyes of the general formula II is chosen in such a manner that dye mixtures according to the invention are formed.

In the dye mixtures according to the invention, the ratio of the various dyes of the general formula I can be varied within relatively wide limits. In general, the minimum relative weight of one component is 10% and its maximum relative weight 90%. In dye mixtures consisting only of two dyes of the general formula I, a weight ratio of 70:30 to 30:70 is preferred, i.e. the relative weight of one dye is 30 to 70%.

The dyes according to the invention of the general formula I and mixtures of these dyes, as well as mixtures with other disperse dyes, are highly suitable for the dyeing and printing of hydrophobic materials.

Examples of suitable hydrophobic materials are, for example, secondary cellulose acetate, cellulose triacetate, polyamide and, in particular, high-molecular-weight polyester, such as, for example polyethylene glycol terephthalate.

The dyes according to the invention of the general formula I and the mixtures of these dyes are preferably used for the dyeing and printing of highmolecular-weight polyester materials, in particular those based on polyethylene glycol terephthalates or mixtures thereof with natural fibre materials, or cellulose triacetate materials.

These materials can be present in the form of sheet- or thread-like structures and be processed, for example, to yarns or woven or knitted textile materials. The dyeing of the fibre material mentioned by means of the dyes according to the invention is carried out in a manner known per se, preferably from aqueous suspension, if appropriate in the presence of carriers, between 80° and about 110° C., by the exhaust process or the HT process in a dyeing autoclave at 110° to 140° C. and by the so-called pad-thermofix method, in which the material is padded by means of the dye liquor and then fixed at about 80° to 230° C. The printing of the materials mentioned can be carried out in such a manner that the material which has been printed by means of the printing pastes containing the dyes according to the invention is treated, if appropriate in the presence of a carrier, at temperatures between 80° and 230° C. with HT steam, pressurized steam or dry heat to fix the dye. This gives very strong red dyeings and prints having very good fastness properties, in particular very good light fastness, and having a low sensitivity to pH and reduction.

The dyes and mixtures according to the invention are also suitable for the dyeing of the hydrophobic materials listed above from organic solvents by the methods known for this type of dyeing and for the dyeing in the mass.

The dyes according to the invention should be present in as finely divided a form as possible in the dyeing liquors and printing pastes used in the above application.

The dyes can be obtained in finely divided form in a manner known per se by suspending the dye formed in the production together with dispersants in a liquid medium, preferably in water, and exposing the mixture to shear forces, as a result of which the dye particles originally present are comminuted mechanically to such an extent that an optimum specific surface area is achieved and sedimentation of the dye is kept to a minimum. The particle sizes of the dyes are in general between 0.5 and 5 μm, preferably about 1 μm.

The dispersants which are used during the milling process can be nonionic or anionic. Nonionic dispersants are, for example, reaction products of alkylene oxides, such as, for example, ethylene oxide or propylene oxide containing alkylatable compounds, such as, for example, fatty alcohols, fatty amines, fatty acids, phenols, alkylphenols and carboxamides. Examples of anionic dispersants are lignosulphonates, alkylsulphonates or alkylarylsulphonates or alkylaryl polyglycol ether sulphates.

For most applications, the dye formulations thus obtained should be pourable. In these cases, the dye and dispersant content is therefore limited. In general, the dispersions are adjusted to a dye content of up to 50% by weight and a dispersant content of up to about 25% by weight. For economical reasons, the dye contents are in most cases not below 15% by weight.

The dispersions can also contain further auxiliaries, for example those which act as oxidizing agents, such as, for example, sodium m-nitrobenzenesulphonate, or fungicides, such as, for example, sodium o-phenylphenolate and sodium pentachlorophenolate.

The dye dispersions thus obtained can be used very advantageously for preparing printing pastes and dye liquors. They are particularly advantageous, for example, in the continous process, in which the dye concentration of the dye liquors needs to be kept constant by feeding dye continuously into the running apparatus.

For certain areas of application, powder formulations are preferred. These powders contain the dye or the dye mixture, dispersant and other auxiliaries, such as, for example, wetting agents, oxidizing agents, preservatives and dust-reducing agents.

A preferred preparation process for pulverulent dye preparations consists in removing the liquid from the liquid dye dispersions described above, for example by vacuum drying, freeze-drying, by drying on drum dryers, but preferably by spray-drying.

The dye liquors are prepared by diluting the necessary amounts of the dye formulations prepared according to the above procedures with the dye medium, preferably with water, to such an extent that a liquor ratio of 1:5 to 1:50 is obtained for the dyeing. In addition, further dyeing auxiliaries, such as dispersants, wetting agents and fixation auxiliaries are in general added to the liquor.

If the dye or the dye mixture are to be used for textile printing, the necessary amounts of the dye formulations are kneaded together with thickeners, such as, for example, alkali metal alginates or the like, and, if appropriate, further additives, such as, for example, fixation accelerators, wetting agents and oxidizing agents, to give printing pastes.

The invention is illustrated in more detail by the examples which follow. The percentages given are by weight.

EXAMPLE 1

( a) 45 7 g of the dye of the formula

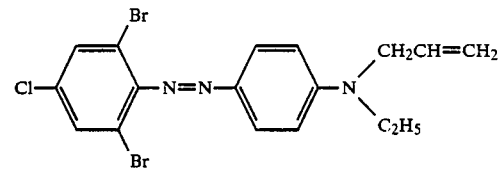

are added to a suspension of 100 ml of dimethyl sulphoxide, 14 g of copper(I) cyanide and 4 g of sodium cyanide at 75° to 80° C., and the mixture is stirred at this temperature for 30 minutes. The temperature is then increased to 110° C. for 30 minutes, and the mixture is then stirred slowly in the cold, the product is filtered off with suction, washed with 45 ml of dimethyl sulphoxide, 7.5% strength aqueous ammonia solution and water, and dried under reduced pressure. This gives a bluish-red dye of the formula

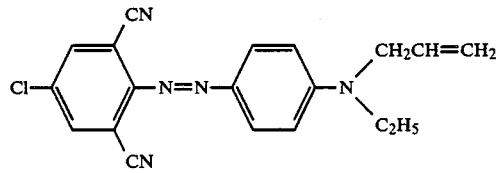

which has an absorption maximum at 513 nm.

A finishing process customary in practice by means of aqueous pearl milling with a dispersant customary in practice and based on lignosulphonate, followed by spray-drying gives a dye preparation ready for dyeing.

(b) 1.2 g of the dye preparation thus obtained are dispersed in 2000 g of water. The dispersion is adjusted to a pH of 4-5 with acetic acid, and 4 g of anhydrous sodium acetate and 2 g of a commercially available dispersant based on a naphthalenesulphonic acid/formaldehyde condensation product are added. The dye liquor thus obtained is entered with 100 g of a polyester fabric based on polyethylene glycol terephthalate, and the dyeing is carried out at 120° C. for 30 minutes. Subsequent rinsing, reductive aftertreatment by means of a 0.2% strength aqueous sodium dithionite solution for 15 minutes at 70° to 80° C., rinsing and drying gives a strong red dyeing having very good colouristic properties. No appreciable amount of dye remains in the dye bath.

(c) If a dye liquor is prepared as described in Example 1b from 0.6 g of the dye prepared according to Example 1a and 100 g of a triacetate fabric are dyed therein at 120° C. for 1 hour and finished as described in Example 1b, a strong red dyeing having very good colouristic properties is obtained.

(d) If the dyeing described in Example 1c is carried out with the addition of a commercially available dyeing accelerator (carrier) at a dyeing temperature reduced to 98°–100° C., an equivalent dyeing having an equivalent dye bath exhaustion is obtained.

EXAMPLE 2

The procedure of Example 1 is repeated, except that the 45.7 g of the dibromoazo dye whose structural formula is mentioned there is replaced by 51.3 g of the dibromoazo dye of the formula

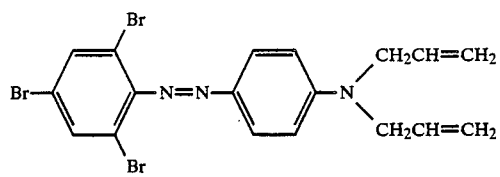

to give 34 g of the dye of the formula

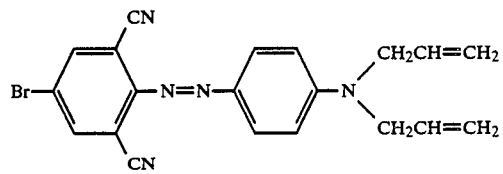

which has its absorption maximum at 507 nm and also dyes polyester in a strong clear red shade which has very good colouristic fastness properties.

The table below lists further dyes according to the invention which also produce on hydrophobic fibre materials strong red dyeings or prints also having very good colouristic properties.

TABLE

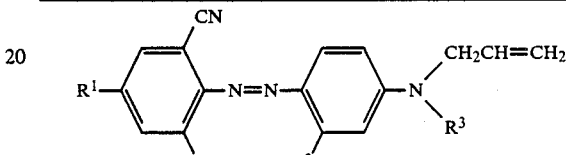

| Example | R¹ | R² | R³ |
|---|---|---|---|
| 3 | Br | H | C₂H₅ |
| 4 | Cl | H | nC₃H₇ |
| 5 | Br | H | nC₃H₇ |
| 6 | Cl | H | nC₄H₉ |
| 7 | Br | H | nC₄H₉ |
| 8 | F | H | C₂H₅ |
| 9 | F | H | nC₃H₇ |
| 10 | F | H | nC₄H₉ |
| 11 | F | H | CH₂CH=CH₂ |
| 12 | Cl | H | CH₂CH=CH₂ |
| 13 | Br | H | CH₂CH=CH₂ |
| 14 | F | H | CH₃ |
| 15 | Cl | H | CH₃ |
| 16 | Br | H | CH₃ |
| 17 | Br | H | iC₃H₇ |
| 18 | Br | H | iC₄H₉ |
| 19 | F | Cl | C₂H₅ |
| 20 | F | Cl | nC₃H₇ |
| 21 | F | Cl | nC₄H₉ |
| 22 | Cl | Cl | CH₃ |
| 23 | Cl | Cl | C₂H₅ |
| 24 | Cl | Cl | nC₃H₇ |
| 25 | Br | Cl | C₂H₅ |
| 26 | Br | Cl | nC₄H₉ |
| 27 | Br | Cl | CH₂CH=CH₂ |
| 28 | Cl | Cl | CH₂CH=CH₂ |
| 29 | F | Cl | CH₂CH=CH₂ |
| 30 | Cl | H | iC₃H₇ |
| 31 | Cl | H | iC₄H₉ |
| 32 | Cl | CH₃ | iC₄H₉ |
| 33 | Cl | Cl | iC₄H₉ |
| 34 | Br | H | (CH₂)₂OCH₃ |
| 35 | Cl | H | (CH₂)₂OCH₃ |
| 36 | F | H | (CH₂)₂OCH₃ |
| 37 | Br | H | (CH₂)₂OC₂H₅ |
| 38 | Cl | H | (CH₂)₂OC₂H₅ |
| 39 | F | H | (CH₂)₂OC₂H₅ |
| 40 | Br | H | (CH₂)₂OnC₃H₇ |
| 41 | Cl | H | (CH₂)₂OiC₃H₇ |
| 42 | Br | H | (CH₂)₂OnC₄H₉ |
| 43 | Cl | H | (CH₂)₂OiC₄H₉ |
| 44 | Cl | H | (CH₂)₄OCH₃ |
| 45 | Br | H | (CH₂)₄OC₂H₅ |
| 46 | Cl | H | (CH₂)₂CN |
| 47 | Cl | H | (CH₂)₃CN |
| 48 | Br | H | (CH₂)₂CN |
| 49 | Br | H | (CH₂)₄CN |
| 50 | Cl | Cl | (CH₂)₂CN |
| 51 | Br | Cl | (CH₂)₂CN |
| 52 | F | Cl | (CH₂)₂CN |
| 53 | F | H | (CH₂)₂CN |
| 54 | Br | H | CH₂CH(CH₃)CN |

TABLE-continued

[Structure: R¹-substituted benzene with CN groups at 2,6 positions, N=N azo link to phenyl with R² and N(CH₂CH=CH₂)(R³)]

| Example | R¹ | R² | R³ |
|---|---|---|---|
| 55 | Cl | H | CH₂CH(CH₃)CN |

The examples below refer to mixtures of dyes according to the invention:

| Example | R¹ | R² | R³ | Relative amount in the mixture |
|---|---|---|---|---|
| 56 | Cl | H | C₂H₅ | 50 |
|    | Cl | H | nC₃H₇ | 50 |
| 57 | Cl | H | C₂H₅ | 60 |
|    | Br | H | C₂H₅ | 40 |
| 58 | Cl | H | C₂H₅ | 35 |
|    | Cl | H | CH₂CH=CH₂ | 65 |
| 59 | Cl | H | CH₂CH=CH₂ | 40 |
|    | Br | H | CH₂CH=CH₂ | 60 |
| 60 | Cl | Cl | C₂H₅ | 50 |
|    | Br | H | C₂H₅ | 50 |
| 61 | F | H | C₂H₅ | 70 |
|    | F | H | nC₃H₇ | 30 |
| 62 | F | H | C₂H₅ | 45 |
|    | F | H | CH₂CH=CH₂ | 55 |
| 63 | F | H | C₂H₅ | 50 |
|    | F | Cl | CH₂CH=CH₂ | 50 |
| 64 | Cl | H | (CH₂)₂CN | 65 |
| 65 | Cl | H | C₂H₅ | 10 |
|    | Br | H | (CH₂)₂CN | 90 |
| 66 | Cl | H | C₂H₅ | 80 |
|    | Br | Cl | (CH₂)₂CN | 20 |
| 67 | Cl | H | (CH₂)₂OCH₃ | 50 |
|    | Cl | H | (CH₂)₂OnC₄H₉ | 50 |
| 68 | Cl | H | (CH₂)₂OCH₃ | 60 |
|    | Br | H | (CH₂)₂OiC₃H₇ | 40 |
| 69 | Cl | H | (CH₂)₂OCH₃ | 75 |
|    | Br | H | (CH₂)₂CN | 25 |
| 70 | Cl | H | CH₂CH=CH₂ | 50 |
|    | Br | H | C₂H₅ | 50 |
| 71 | Br | H | C₂H₅ | 45 |
|    | Br | H | nC₄H₉ | 55 |
| 72 | Cl | H | C₂H₅ | 33⅓ |
|    | Cl | H | nC₄H₉ | 33⅓ |
|    | Cl | H | CH₂CH=CH₂ | 33⅓ |
| 73 | Br | H | C₂H₅ | 40 |
|    | Cl | H | nC₄H₉ | 30 |
|    | Br | H | CH₂CH=CH₂ | 30 |
| 74 | Br | Cl | CH₂CH=CH₂ | 20 |
|    | Br | H | C₂H₅ | 50 |
|    | Cl | H | nC₃H₇ | 30 |

What is claimed is:

1. Monoazo dyes of the formula

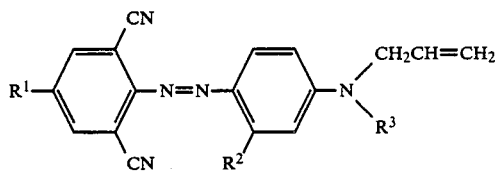

in which
R¹ is fluoro, chloro or bromo;
R² is hydrogen or chloro; and
R³ is allyl, alkyl having 1 to 4 carbon atoms, alkoxyalky having 2 to 4 carbon atoms in the alkyl portion and 1 to 4 carbon atoms in the alkoxy portion or cyanoalkyl having 2 to 4 carbon atoms.

2. Monoazo dyes according to claim 1 wherein R³ is allyl, ethyl or n-propyl.

3. Monoazo dyes according to claim 1 wherein R¹ is chloro or bromo.

4. Monoazo dyes according to claim 3 wherein R³ is allyl, ethyl or n-propyl.

5. Monoazo dyes according to claim 1 wherein R¹ is chloro or bromo and R² is hydrogen.

6. Monoazo dyes according to claim 5 wherein R³ is allyl, ethyl or n-propyl.

7. Mixtures of two or more different monoazo dye species of the formula according to claim 1.

8. In the process of printing or dyeing hydrophobic materials by applying monoazo dyes to the materials, the improvement comprises applying monoazo dyes as claimed in claim 1 to the materials.

9. In the process of printing or dyeing hydrophobic materials by applying monoazo dyes to the materials, the improvement comprises applying a mixture of monoazo dyes as claimed in claim 9 to the materials.

* * * * *